United States Patent [19]

Human

[11] Patent Number: 4,808,969
[45] Date of Patent: Feb. 28, 1989

[54] MOTOR VEHICLE PARKING DEVICE
[76] Inventor: Lance Human, c/o Dr. V. Benatar, M.Bch.B., F.R.C.S, F.R.C.O.g., M.D., 8635 W. 3d St., Ste. 780 W., Los Angeles, Calif. 90048
[21] Appl. No.: 33,839
[22] Filed: Apr. 3, 1987
[51] Int. Cl.[4] .............................. B60Q 1/48
[52] U.S. Cl. .................................. 340/95; 340/107
[58] Field of Search ............ 340/95, 107, 70, 74, 340/81 R; 307/10 LS

[56] References Cited

U.S. PATENT DOCUMENTS

| | | | |
|---|---|---|---|
| 1,640,275 | 8/1927 | Hitchcock | 340/95 |
| 2,866,175 | 12/1958 | Slater | 340/74 |
| 3,905,017 | 9/1975 | Samra | 340/95 |
| 4,013,996 | 3/1977 | Hubbard | 340/70 |
| 4,191,939 | 3/1980 | Bauman | 340/107 |

*Primary Examiner*—Joseph A. Orsino
*Assistant Examiner*—Brian R. Tumm
*Attorney, Agent, or Firm*—John Wade Carpenter

[57] ABSTRACT

A complete motor vehicle parking device having a plurality of transparent plates bearing the latter "P", and a plurality of lights for illuminating at least one of the plurality of transparent plates. The motor vehicle parking device includes a circuitry that is electrically situated between the power source and the plurality of lights in order to illuminate any one, or combination of a plurality of lights.

4 Claims, 4 Drawing Sheets

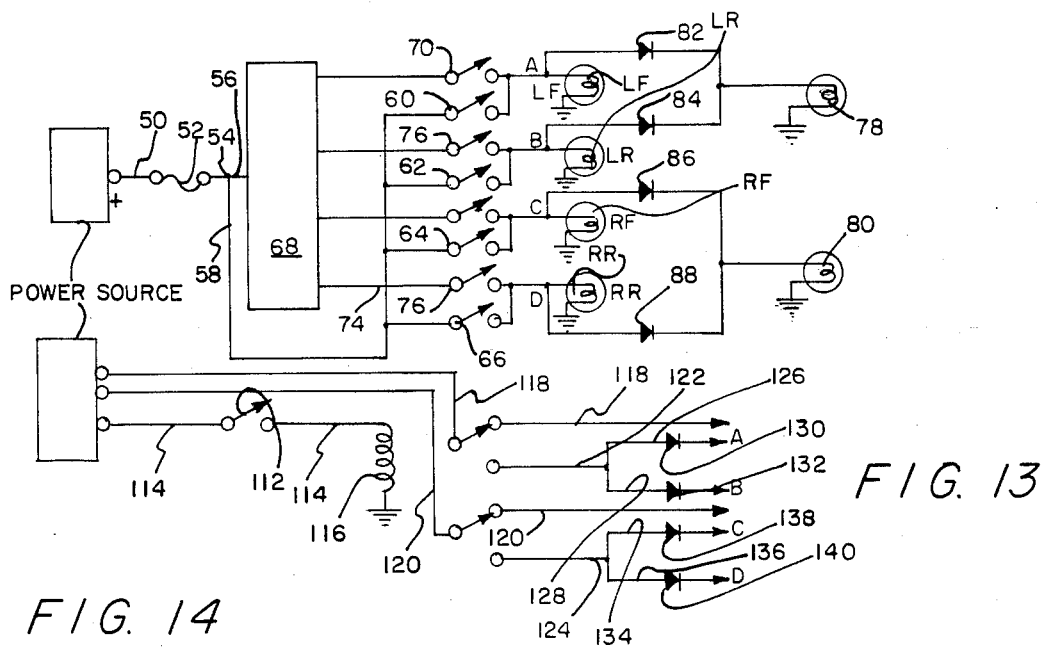
FIG. 13
FIG. 14
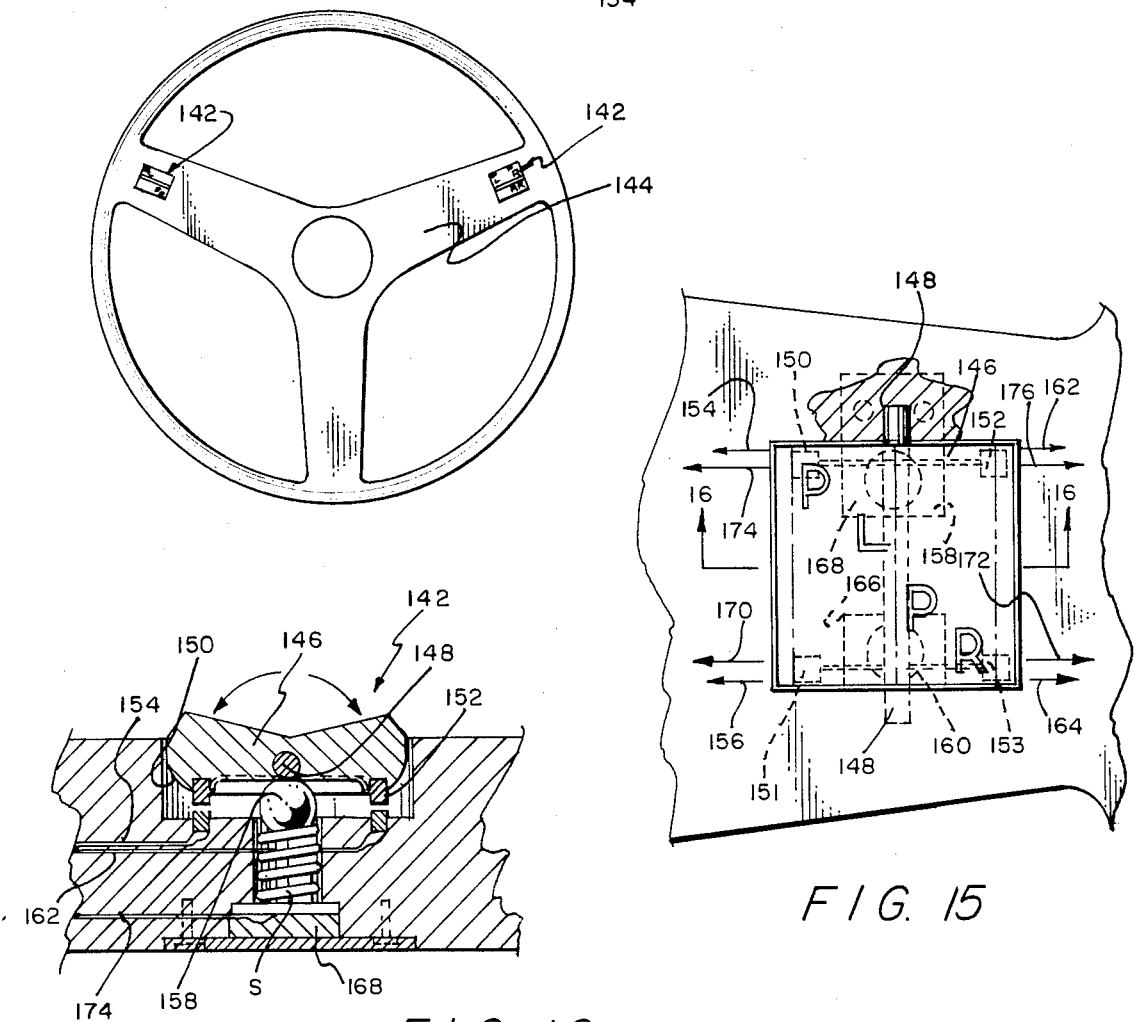
FIG. 15
FIG. 16

MOTOR VEHICLE PARKING DEVICE

BACKGROUND OF THE INVENTION

1. Field of the Invention

This invention is related to parking indicators. More specifically, this invention provides for a complete motor vehicle parking device having a plurality of lights which illuminate a "P" that has been positioned on at least one transparent plate.

2. Description of the Prior Art

U.S. Pat. Nos. 3,656,104, 3,800,430, and 3,905,017 to Samra teaches and disclose a multi-purpose vehicle signal device. U.S. Pat. No. 1,640,275 to Hitchcock discloses an automobile signal. U.S. Pat. No. 1,969,116 by Bobroff teaches a signalling device for an automobile or the like. U.S. Pat. No. 2,866,175 by Slater discloses a motor-vehicle signalling system. None of the foregoing prior art patents teach or suggest the particular motor vehicle parking system of this invention.

SUMMARY OF THE INVENTION

The present invention accomplishes its desired objects by broadly providing a complete motor vehicle parking device for mounting on a car, or the like. The parking device includes a plurality of transparent plates bearing the letter "P" thereon, and a means for illuminating at least one of the plurality of transparent plates bearing the letter "P" and thereby rendering said letter "P" clearly visable. The means for illuminating comprises a power source and an electrical circuitry means secured to the power source. A plurality of lights are positioned electrically on the car and electrically connected to the electrical circuitry means in order to be illuminated thereby.

In one embodiment of the invention the motor vehicle parking device includes a back-up circuitry means electrically secured to the electrical circuitry means. In another embodiment of the invention, the motor vehicle parking device comprises a pulsating power circuitry means electrically engaged to the electrical circuitry means.

Therefore, it is an object of the present invention to provide parking indicators.

It is another object of this invention to provide a complete motor vehicle parking device which includes parking indicators and an electrical circuitry means engaged to the parking indicators in order to indicate when a motor vehicle is being parked.

These, together with the various ancillary objects and features which become apparent to those skilled in the art as the following description proceeds, are attained by this novel complete motor vehicle parking device, a preferred embodiment being shown with reference to the accompanying drawing by way of example only, wherein:

BRIEF DESCRIPTION OF THE DRAWINGS

FIG. 13 is another embodiment of an electrical diagram of an electrical circuitry for the parking indicators of this invention;

FIG. 14 is a front elevational view of a steering wheel for a car having positioned thereon two rocker switch means;

FIG. 15 is a top plane view of the rocker switch means of this invention; and

FIG. 16 is a vertical sectional view taken in direction of the arrows along the plane of line 16—16 in FIG. 15.

DETAILED DESCRIPTION OF THE INVENTION

Figure 1:
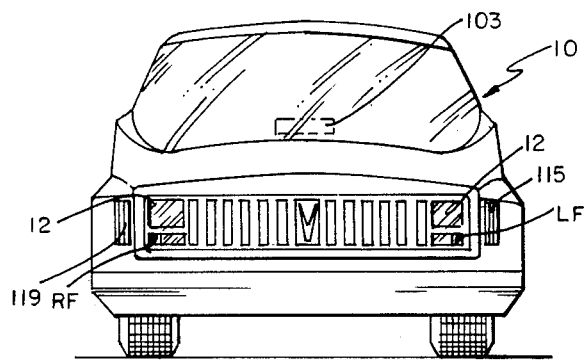
FIG. 1 is a front view of a car disclosing a parking indicator with "P", and positioned underneath a pair of headlights.
Figure 2:
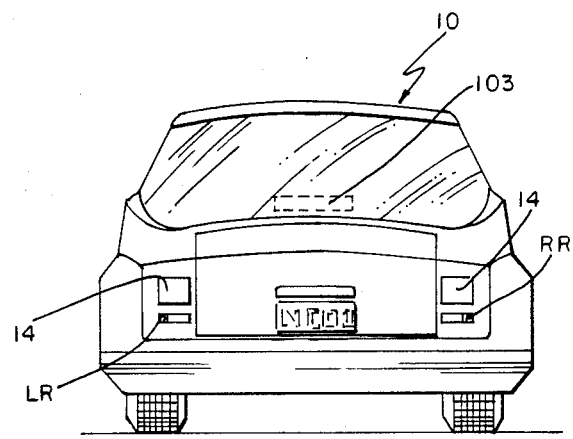
FIG. 2 is a rear elevational view of the car of FIG. 1 with the parking indicators situated in the rear of the car and underneath a pair of brake lights.
Figure 3:
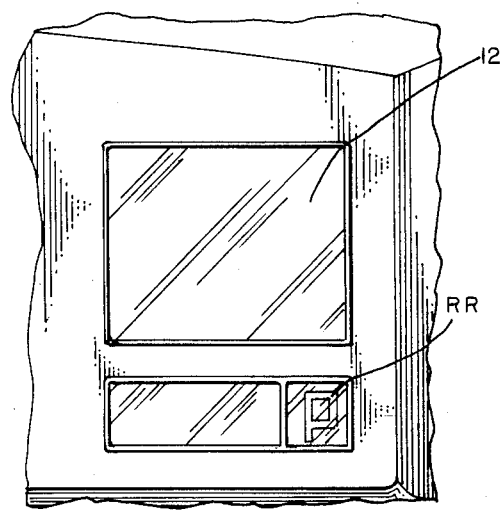
FIG. 3 is an enlarged front elevational view of the headlight and parking indicator on the car of FIG. 1.
Figure 4:
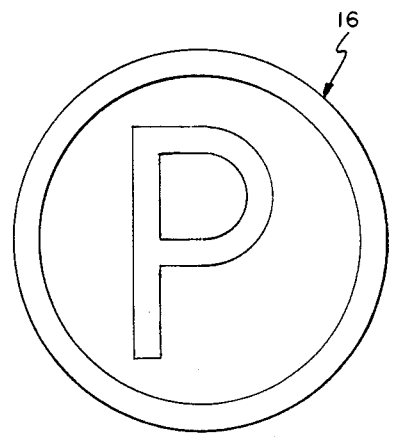
FIG. 4 is a front elevational view of one embodiment of a parking indicator with "P"
Figure 6:
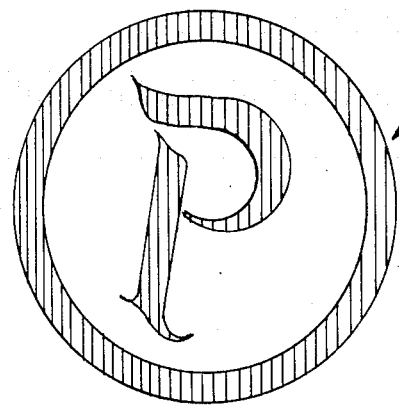
FIG. 6 is another embodiment of the parking indicator and represented by "P"
Figure 7:
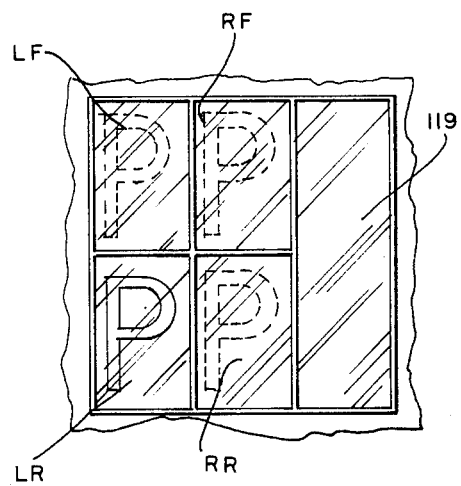
FIG. 7 is a front elevational view of a cluster of parking indicators having a "P"
Figure 9:
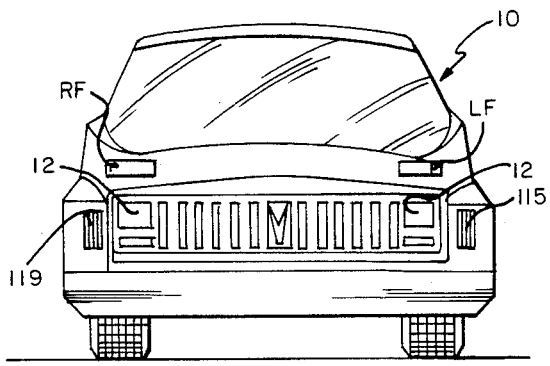
FIG. 9 is a front elevational view of a car having the parking indicator positioned in another location than the location in FIG. 1.
Figure 10:
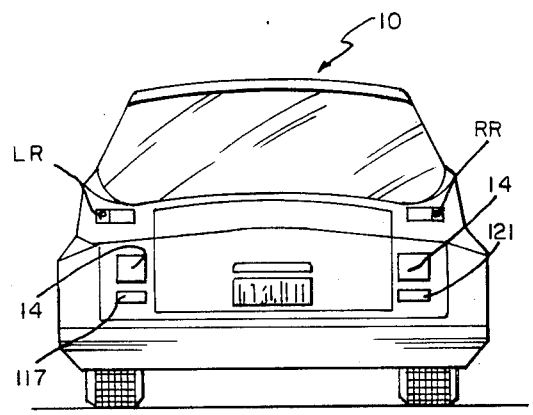
FIG. 10 is a rear elevational of the car having the parking indicator situated at another location other than the location in FIG. 2.
Figure 11:
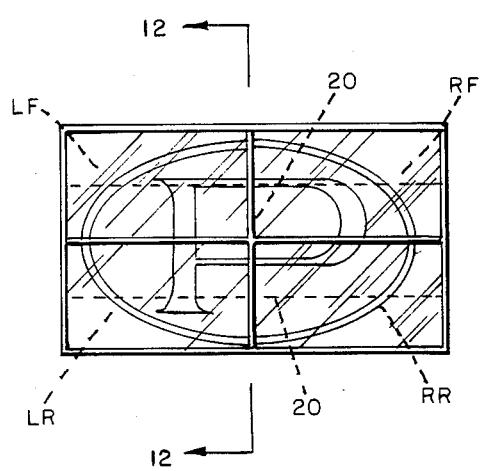
FIG. 11 is another embodiment of the parking indicator having a single "P"
Figure 12:
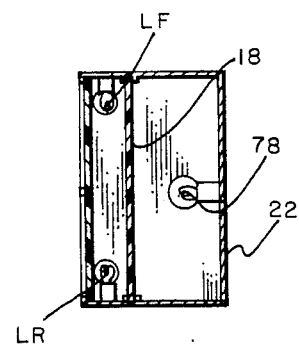
FIG. 12 is a vertical sectional view taken in direction of the arrows and along the plane of line 12—12 in FIG. 11.

Referring in detail now to the drawings, wherein similar parts of the invention are identified by like reference numerals, there is seen a car, generally illustrated as 10, having head lights 12—12 and brake lights 14—14. The car 10 also has a left front parking light LF, a left rear parking light LR, a right front parking light RF, and a right rear parking light RR. The lights LF, LR, RF and RR may be overlaid with any transparent lens having a suitable "P", generally illustrated as 16, that is illuminated when a light is lit. By way of illustration only, suitable "P" 16 to be illuminated are illustrated in FIGS. 4 and 6. Other suitable "P" are also illustrated in FIGS. 3, 7 and 11. The lights LF, LR, RF and RR may be positioned separately about the car 10, as illustrated in FIGS. 1, 2, 9 and 10, or in a cluster as illustrated in FIG. 11. The cluster of FIG. 11 may be positioned anywhere on the car 10 and in more than one place. The cluster of FIG. 11 also includes a transparent partition 18 behind which lie a left indicator signal light 78 and a right indicator signal light 80 (see FIG. 12 where the left indicator signal light 78 is illustrated). Separating signal light 78 from signal light 80 is an opaque partition that interconnects from transparent partition 18 to a back 22 (see FIG. 12) of the cluster. The cluster may have the embodiment of FIG. 7 which includes a turn signal light in combination therewith. In FIG. 7, the turn signal light is a right turn signal light 119, by way of illustration only. All parking indicator lights, including lights LF, LR, RF and RR and indicator lights 78 and 80, may be controlled by the circuit of FIGS. 5 and 13.

Figure 5:
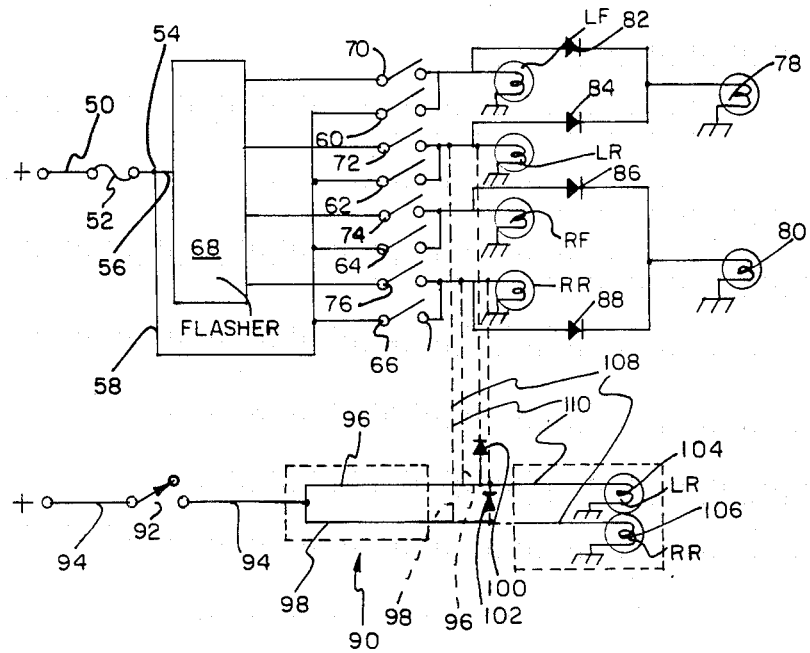
FIG. 5 is one embodiment of the electrical circuitry means for the parking indicators of this invention.

The circuits of FIGS. 5 and 13 use the power source (i.e. a battery) from the engine of the car 10. The power source supplies power through conductor 50 having a fuse 52. At juncture 54, conductor 50 is bifurcated into a pair of paths, 56 and 58. Path 58 supplies steady current to the left front parking light LF, left rear parking light LR, right front parking light RF, left rear parking light LR, right front parking light RF, and right rear parking light RR via switches 60, 62, 64, and 66 respectively. Path 56 supplies steady current to the flasher unit 68 which delivers intermittent current to the left front parking light LF, left rear parking light LR, right front parking light RF, and right rear parking light RR via switches 70, 72, 74 and 76, respectively. The circuit of FIG. 5 is such that all possible modes for energizing the left front parking light LF, left rear parking light LR, right front parking light RF, and right rear parking light RR can be selected through switches 60, 62, 64 and 66.

If it is desired to flash the left front parking light LF and the left rear parking light LR, switches 70 and 72 are closed. In order to prevent the left front parking light LF and the left rear parking light LR from flashing, switches 60 and 62 are closed. Similarly, if it is desired to flash the right front parking light RF and the right rear parking light RR, switches 74 and 76 are closed. To flash only the left front parking light LF or only the left rear parking light LR, switch 70 or switch 72 is closed respectively. To non-flash only the left front parking light LF or to non-flash only the left rear parking light LR, switch 60 or switch 62 is closed, respectively. To flash only the right front parking light RF or only the right rear parking light RR, switch 74 or switch 76 is closed respectively. To non-flash only the right front parking light RF or to non-flash only the right rear parking light RR, switch 64 or switch 66 is closed respectively.

If it is desired to flash all parking lights (i.e. left front parking light LF, right front parking light RF, left rear parking light LR, and right rear parking light RR), switches 70, 72, 74 and 76 are closed. Similarly, if all parking lights are to be in a non-flashing posture, switches 60, 62, 64 and 66 are closed. To flash the left and right rear parking lights LR and RR, switches 72 and 76 are closed. To flash the left and right front parking lights LF and RF, switches 70 and 74 are closed. For non-flashing the left and right rear parking lights LR and RR, switches 62 and 66 are closed; and non-flashing the left and right front parking lights LF and RF entails closing switches 60 and 64. It is therefore possible to set all possible combinations of flashing and non-flashing lights by closing the appropriate switches.

The circuits of FIGS. 5 and 13 additionally include the left indicator signal light 78 and the right indicator signal light 80. The left indicator signal light 78 operates in a flashing mode whenever the left front parking light LF or the left rear parking light LR is in the flashing mode. Similarly, the left indicator signal light 78 operates in a non-flashing mode whenever the left front parking light LF or the left rear parking light LR is in the non-flashing mode. If the left front parking light LF is in a flashing mode and the left rear parking light LR is in a non-flashing mode, and vice versa, then the left indicator light 78 will be in a non-flashing mode. The left indicator light 78 is energized through diodes 82 and 84 (each preferably having a value that is capable of passing current having a value of from about 5 amps to about 15 amps). The purpose of diodes 82 and 84 is to isolate the left front parking light LF and the left rear parking light LR such that when the left front parking light LF is energized, the left indicator light 78 can be energized without energizing the left rear parking light LR, and vice versa.

The right indicator signal light 80 operates in a flashing mode whenever the right front parking light RF or the right rear parking light RR is in the flashing mode. Similarly, the right indicator signal light 80 operates in a non-flashing mode whenever the right front parking light RF or the right rear parking light RR is in the non-flashing mode. If the right front parking light RF is in a flashing mode and the right rear parking light RR is in a non-flashing mode, and vice versa, then the right indicator light 80 will be in a non-flashing mode. The right indicator light 80 is energized through diodes 86 and 88 (each preferably having a value that is capable of passing current having a value of from about 5 amps to about 15 amps). Similar to the purpose of diodes 82 and 84, the purpose of diodes 86 and 88 is to isolate the right front parking light RF and the right rear parking light RR such that when the right front parking light RF is energized, the right indicator light 80 can be energized without energizing the right rear parking light RR, and vice versa.

The circuit of FIG. 5 additionally depicts, generally as 90, a back-up circuitry implemented to the parking light circuitry including the left and right indicator signal lights 78 and 80. Back-up circuitry 90 comprises a back-up switch 92 (which can be closed when the car 10 is placed in reverse) in communication with the car's power source via conductor 94. Conductor 94 bifurcates into a pair of conductors 96 and 98 that respectively lead to right rear light RR and to left rear light LR. As illustrated in FIG. 5, conductor 108 is connected to conductor 96 and conductor 110 is connected to conductor 98. Conductors 108 and 110 respectively have diodes 100 and 102 (each preferably having a value that is capable of passing current having a value of from about 5 amps to about 15 amps). Diodes 100 and 102 serve to isolate lights LR and RR from each other by preventing current flow from conductors 108 and 110 to conductors 96 and 98. If switch 72 or 62 is closed, light LR will be illuminated. Diode 100 prevents current flow from conductor 108 to conductor 96; thus, lights 104, 106, and RR will not be illuminated. If switch 76 or 66 is closed, light RR will be illuminated. Diode 102 prevents current flow from conductor 110 to conductor 98, thus lights 104, 105, and RR will not be illuminated. If switch 62 or 72 and switch 76 or 66 are closed, parking lights LR and RR will be illuminated. Diodes 100 and 102 will prevent backup lights 104 and 106 from being illuminated whenever switch 92 is open. Thus, the diodes allow the simultaneous illumination of the parking lights LR, RR, and the backup lights 104 and 106 via switch 92 whenever the car is in reverse. They also provided for individual or simultaneous illumination of parking lights LR and RR via switches 72 and 62 and switches 76 and 66 without illumination of the backup lights 104 and 106.

In the embodiment of the invention having a light within a housing 103 mounted on the deck in front of the rear window in the passenger compartment of the car 10 (see FIG. 1 and FIG. 2), a left upper rear light 104 and a right upper rear light 106 (which may straddle an existing light in the housing) are mounted to the left and to the right respectively within the housing 103. Diode 100 is now located in series with conductor 96. Diode 102 is not located in series with conductor 98. This embodiment allows lights 104 and 106 to electrically communicate with the parking lights LR and RR respectively. When the car is placed in reverse, lights 104, 106, LR, and RR are illuminated via conductor 94, switch 92, conductors 96, 98, 108, and 110.

When the car is not in reverse, switch 92 is open and if switch 72 or 62 is closed the left parking light LR is illuminated as well as backup light 104. Diode 100 allows one to illuminate LR and 104 without illuminating RR and 106. Similarly, if switches 92, 72, and 62 are open, one can illuminate lights RR and 106 by closing either switch 76 or 66. Diode 102 allows one to illuminate lights RR and 106 without illuminating lights LR and 104. When the left rear light LR is energized, light 104 is also energized. Likewise, when the right rear light RR is energized, light 106 is also energized.

Figure 8:
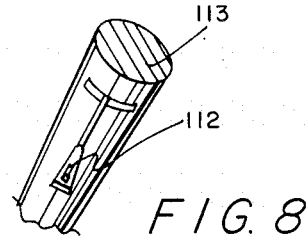
FIG. 8 is a partial vertical sectional view of a turn signal lever having a switch means thereon which is part of the back-up circuitry means.

The circuit of FIG. 13 includes a switch 112 mounted on a turn signal lever 113 (see FIG. 8) for providing pulsating power (i.e. turn signal pulsating power source) to the parking lights. Switch 112 communicates with the car's power source through conductor 114 which is in communication with a control relay 116. Control relay 116 is preferably a double pole double throw relay. When the switch 112 is in an open position pulsating power is fed to the turn signal lights through conductors 118 and 120 (which respectively lead to the left front turn signal 115 and left rear turn signal 117, and to the right front turn signal 119, and right rear turn signal 121) in the normal fashion and the turn signal lights 115, 117, 119 and 121 operate in the normal fashion. If switch 112 is closed, control relay 116 is energized in order to open the signal path to the turn signal lights 115, 117, 119 and 121, and applies the power through conductors 122 and 124. Conductor 122 bifurcates into conductors 126 and 128 respectively having diodes 130 and 132 (each preferably having a value that is capable of passing current having a value of from about 5 amps. to about 15 amps.) and connecting electrically, respectively, to points A and B on the circuit in FIG. 13. Similarly, conductor 124 bifurcates into conductors 134 and 136 respectively having diodes 138 and 140 (each preferably having a value that is capable of passing current having a value of from about 5 amps. to about 15 amps.) and connecting electrically, respectively, to points C and D on the circuit in FIG. 13. If the turn signal lever is placed in a left turn position and switch 112 is closed to energize relay 116, the left front parking light LF and the left rear parking light LR flash instead of the left front turn signal light 115 and the left rear turn signal light 117. If the turn signal lever is positioned in the right turn position and switch 112 is again closed to energize relay 116, the right front parking light RF and the right rear parking light RR flash instead of the right front turn signal light 119 and the right rear turn signal light 121.

If the turn signal lever is in the neutral position and the switch 112 is pushed, no parking lights will be lit. In addition to diodes 82, 84, 86 and 88, diodes 130, 132, 138 and 140 are utilized to isolate the system.

In a preferred embodiment of the invention, switches 70, 72, 74 and 76 leading from the flasher unit 68 are integrated into or formed into the one switch, generally illustrated as 142, of FIG. 15 and FIG. 16. Likewise, switches 60, 62, 64 and 66 in communication with conductor 58 are also integrated into or formed into the switch 142 of FIG. 15 and FIG. 16. Two (2) switches 142—142 are preferably mounted on the steering wheel 144 (see FIG. 14) of the car 10, with one switch 142 on one side of the steering wheel and the other switch 142 on the other side of the steering wheel 144.

Switch (142 see FIGS. 15 and 16) comprises a top rocker member 146 pivotally supported on a rod 148 that transverses the middle of the structure of the top rocker member 146 (as illustrated in FIG. 15) and is supported at both ends by the structure of the steering wheel 144. Rod 148 pivotally rests on a pair of balls 158 and 160. The underside of the rocker member 146 is formed with contacts 150, 151, 152, and 153. Extending from contacts 150 and 151 are conductors 154 and 156 respectively. Extending from contacts 152 and 153 are conductors 162 and 164 respectively. Contacts 150 and 152 are in contact with ball 158 (as illustrated in FIG. 15). Similarly, contacts 151 and 153 are in contact with ball 160. Balls 158 and 160 are supported by a pair of bases 166 and 168. Each base 166 and 168 is provided with an upright helical spring S support that is in contact with ball 158 and 160 respectively (as illustrated in FIG. 16). Extending from the base 166 are conductors 170 and 172, and extending from the base 168 are conductors 174 and 176. Conductors 154, 156, 162 and 164 lead to flasher unit 68. Conductor 170 leads to the left rear parking light LR and 174 leads to the left front parking light LF. Conductor 172 leads to the right rear parking light RR and conductor 176 extends to the right front parking light RF. When the "PL" side of the top rocker 146 is pushed, contacts 150 and 151 contact conductors 154 and 156 and closes the circuit from conductors 154 and 156 through contacts 150 and 154, through balls 158 and 160, helical springs S and S, bases 168 and 166 and conductors 170 and 174, respectively. This sends intermittent power to left front parking light LF and left rear parking light LR and causes them to flash. Similarly, when the "PR" side of the top rocker 146 is pushed, contacts 152 and 153 contact conductors 162 and 164 and closes the circuit from conductors 162 and 164 through contacts 152 and 153 through balls 158 and 160, helical springs S and S, bases 168 and 166, and conductors 176 and 172, respectively. This sends intermittent power to the right front parking light RF and right rear parking light RR and causes them to flash.

While the present invention has been described herein with reference to particular embodiments thereof and examples therefor, a latitude of modification, various changes and substitutions are intended in the foregoing disclosure and it will be appreciated that in some instances some features of the invention will be employed without a corresponding use of other features without departing from the scope of the invention as set forth.

I claim:
1. A complete motor vehicle parking device for mounting on a car, or the like, comprising:
a plurality of transparent plates bearing the letter "P" thereon; and means for illuminating at least one of said plurality of transparent plates bearing the letter "P" and thereby rendering said letter "P" clearly visible, said means for illuminating comprising a flasher unit means, a first conductor means electrically connected to said flasher unit means, a fuse means positioned in said first conductor means, a left front parking light means, a left rear parking light means, a right front parking light means, a right rear parking light means, a second conductor means connecting to said first conductor means between said fuse means and said flasher unit means, a third conductor means interconnecting electrically said flasher unit means with said left front parking light means and having a first switch means for controlling the flow of electricity from the flasher unit means to the left front parking light means, a fourth conductor means interconnecting electrically said flasher unit means with said left rear parking light means and having a second switch means for controlling the flow of electricity from the flasher unit means to the left rear parking light means, a fifth conductor means interconnecting electrically said flasher unit means with said right front parking light means and having a third switch means for controlling the flow of electricity from the flasher unit means to the right front parking light means, a sixth conductor means interconnecting electrically said flasher unit means with said right rear parking light means and having a fourth switch means for controlling the flow of electricity from the flasher unit to the right rear parking light means, said second conductor means connecting electricity to said third conductor means between said first switch means and said left front parking light means and having a fifth switch means for controlling the flow of electricity, a seventh conductor means connecting from said second conductor means to said fourth conductor means between said second switch means and said left rear parking light means and having a sixth switch means for controlling the flow of electricity, an eight conductor means connecting from said second conductor means to said fifth conductor means between said third switch means and said right front parking light means and having a seventh switch means for controlling the flow of electricity, a ninth conductor means connecting from the second conductor to said sixth conductor means between said fourth switch means and said right rear parking light means and having an eighth switch means for controlling the flow of electricity, a tenth conductor means connecting from said third conductor means between said left front parking light means and the junction of said second conductor means to said third conductor means and further connecting to said fourth conductor means between the juncture of said seventh conductor means to said fourth conductor means, said tenth conductor means including a first diode means and a second diode means; a first indicator signal light electrically attached to said tenth conductor means between said first and second diode means, an eleventh conductor means connecting from said fifth conductor means between said right front parking light means and the juncture of said eighth conductor means to said fifth conductor means to said sixth conductor means and further connecting between said right rear parking light and the juncture of said ninth conductor means to said sixth conductor means, said eleventh conductor means including a third diode means and a fourth diode means, a second indicator signal light electrically attached to said eleventh conductor means between said third and fourth diode means.

2. A complete motor vehicle parking device for mounting on a car, or the like, comprising:
a plurality of transparent plates bearing the letter "P" thereon; and means for illuminating at least one of said plurality of transparent plates bearing the letter "P" and thereby rendering said letter "P" clearly visible, said means for illuminating comprising a power source a flasher unit means, a first conductor means electrically connecting said power source with said flasher unit means, a fuse means positioned in said first conductor means between said power source and said flasher unit means, a left front parking light means, a left rear parking light means, a right front parking light means, a right rear parking light means, a second conductor means connecting to said first conductor means between said fuse means and said flasher unit means, a third conductor means interconnecting electrically said flasher unit means with said left front parking light means and having a first switch means for controlling the flow of electricity from the flasher unit means to the left front parking light means, a fourth conductor means interconnecting electrically said flasher unit means with said left rear parking light means and having a second switch means for controlling the flow of electricity from the flasher unit means to the left rear parking light means, a fifth conductor means interconnecting electrically said flasher unit means with said right front parking light means and having a third switch means for controlling the flow of electricity from the flasher unit means to the right front parking light means, a sixth conductor means interconnecting electrically said flasher unit means with said right rear parking light means and having a fourth switch means for controlling the flow of electricity from the flasher unit means to the right rear parking light means, said second conductor means connecting electrically to said third conductor means between said first switch means and said left front parking light means and having a fifth switch means for controlling the flow of electricity, a seventh conductor means connecting from said second conductor means to said fourth conductor means between said second switch means and said left rear parking light means and having a sixth switch means for controlling the flow of electricity, an eighth conductor means connecting from said second conductor means to said fifth conductor means between said third switch means and said right front parking light means and having a seventh switch means for controlling the flow of electricity, a ninth conductor means connecting from the second conductor to said sixth conductor means between said fourth switch means and said right rear parking light means and having an eighth switch means for controlling the flow of electricity, a tenth conductor means connecting from said third conductor means between said left front parking light means and the juncture of said second conductor means to said third conductor means and further connecting to said fourth conductor means between the juncture of said seventh conductor means to said fourth conductor means, said tenth conductor means including a first diode means and a second diode means; a first indicator signal light electrically attached to said tenth conductor means between said first and second diode means, an eleventh conductor means connecting from said fifth conductor means between said right front parking light means and the juncture of said eighth conductor means to said fifth conductor means to said sixth conductor means and further connecting between said right rear parking light and the juncture of said ninth conductor means to said sixth conductor means, said eleventh conductor means including a third diode means and a fourth diode means, a second indicator signal light electrically attached to said eleventh conductor means between said third and fourth diode means; and a pulsating power circuitry means electrically secured to said fourth conductor means and to said sixth conductor means.

3. The parking device of claim 2 wherein said pulsating power circuitry means comprises a ninth switch means mounted on a turn signal lever means and in electrical communication with said power source; a relay means in electrical communication with said power source, said ninth switch means being positioned between said relay means and said power source; a twelfth conductor means extending from said power source to a first turn signal light; a thirteenth conductor means extending from said power source to a second turn signal;

a fourteenth conductor means in electrical communication with said third and fourth conductor means; a fifth diode means electrically situated between said fourteenth conductor and said third conductor means; a sixth diode means electrically situated between said fourteenth conductor means and said fourth conductor means; a seventh diode means electrically situated between said fifteenth conductor means and said fifth conductor means; an eighth diode means electrically situated between said fifteenth conductor means and said sixth conductor means; a tenth switch means electrically engaged to said twelfth conductor means; and an eleventh switch means electrically engaged to said thirteenth conductor means.

4. The parking device of claim 3 additionally comprising a rocker switch means, said rock switch means being mounted on a steering wheel and comprising said first, second, third, fourth, fifth, sixth, seventh and eighth switch means.

* * * * *